(12) United States Patent
Welsh

(10) Patent No.: US 10,647,419 B1
(45) Date of Patent: May 12, 2020

(54) UNMANNED AERIAL VEHICLE CONFIGURATION

(71) Applicant: Amazon Technologies, Inc., Seattle, WA (US)

(72) Inventor: Ricky Dean Welsh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/717,831

(22) Filed: Sep. 27, 2017

Related U.S. Application Data

(63) Continuation of application No. 14/860,377, filed on Sep. 21, 2015, now Pat. No. 9,815,552.

(51) Int. Cl.
| | |
|---|---|
| *B64C 27/08* | (2006.01) |
| *B64C 27/20* | (2006.01) |
| *B64C 39/12* | (2006.01) |
| *B64C 27/26* | (2006.01) |
| *B64C 27/10* | (2006.01) |

(52) U.S. Cl.
CPC .............. *B64C 27/20* (2013.01); *B64C 27/10* (2013.01); *B64C 27/26* (2013.01); *B64C 39/12* (2013.01)

(58) Field of Classification Search
CPC ........ B64C 27/10; B64C 27/20; B64C 39/001
See application file for complete search history.

(56) References Cited

U.S. PATENT DOCUMENTS

| | | | |
|---|---|---|---|
| 3,049,320 A | 8/1962 | Fletcher | |
| 4,807,830 A | 2/1989 | Horton | |
| 4,828,205 A | 5/1989 | Durand | |
| 5,150,857 A | 9/1992 | Moffitt et al. | |
| 5,152,478 A | 10/1992 | Cycon et al. | |
| 5,226,350 A | 7/1993 | Cycon et al. | |
| 5,277,380 A | 1/1994 | Cycon et al. | |
| 5,340,279 A | 8/1994 | Cycon et al. | |
| 5,351,913 A | 10/1994 | Cycon et al. | |
| 6,170,778 B1 | 1/2001 | Cycon et al. | |
| 6,270,038 B1 | 8/2001 | Cycon et al. | |
| 7,032,859 B2 | 4/2006 | Mohr | |
| 7,032,861 B2 | 4/2006 | Sanders et al. | |
| 7,267,300 B2 | 9/2007 | Heath et al. | |
| 7,410,123 B2 | 8/2008 | Nunnally | |
| 7,604,198 B2 * | 10/2009 | Petersen | B64C 27/10 244/17.23 |
| 7,825,554 B2 * | 11/2010 | Bastian, II | B64C 27/20 244/12.2 |
| 2003/0136875 A1 | 7/2003 | Pauchard | |
| 2005/0082421 A1 | 4/2005 | Perlo et al. | |
| 2016/0101852 A1 | 4/2016 | Jiang | |

\* cited by examiner

*Primary Examiner* — Richard R. Green
*Assistant Examiner* — Michael B. Kreiner
(74) *Attorney, Agent, or Firm* — Athorus, PLLC

(57) ABSTRACT

This disclosure describes a configuration of an unmanned aerial vehicle ("UAV") in which the fuselage of the UAV is center mounted and at least some of the motors are configured to encompass at least a portion of the fuselage. In such a configuration, the stator and rotor of the motor extend around a perimeter of the fuselage, the propellers are coupled to an outer perimeter of the rotor, and the propellers extend radially outward away from the fuselage. Likewise, a closed wing may be coupled to the fuselage and positioned to encompass the radially extending propellers and at least a portion of the fuselage.

19 Claims, 9 Drawing Sheets

UNMANNED AERIAL VEHICLE CONFIGURATION

CROSS-REFERENCE TO RELATED APPLICATIONS

This application is a continuation of U.S. patent application Ser. No. 14/860,377, filed Sep. 21, 2015, the contents of which are incorporated herein by reference in their entirety.

BACKGROUND

Multi-propeller aerial vehicles (e.g., quad-copters, octo-copters) are becoming more common. All such vehicles require a body configuration that will support the separation of the multiple propellers, the control components, the power supply (e.g., battery), etc. However, there is a balance between weight and duration of flight. As the weight increases, for example to support more components, the flight duration will decrease. Likewise, the exposed propellers present hazards to objects around the multi-propeller aerial vehicle.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
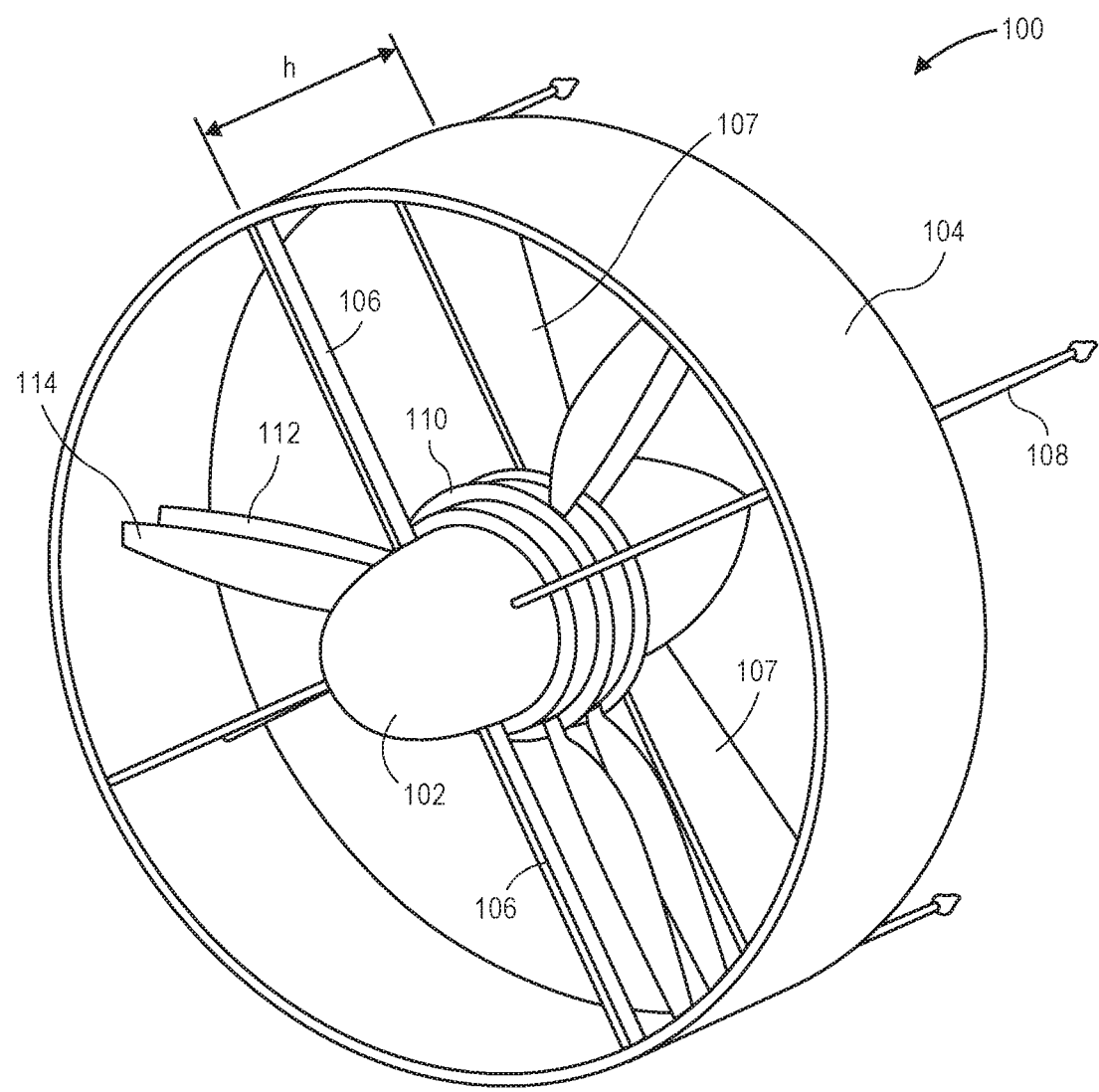
FIG. 1 depicts a diagram of an unmanned aerial vehicle with a center mounted fuselage and a closed wing, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes a configuration of an unmanned aerial vehicle ("UAV") having a center mounted fuselage and a closed wing that encompasses the propellers of the UAV. In the implementations described herein, at least a portion of the fuselage has a cylindrical shape and the stator of the motor(s) that rotate the propellers of the UAV are mounted around the exterior of the fuselage, or are incorporated into the cylindrical perimeter of the fuselage. The rotors of the motors rotate around the stators and the propellers are mounted to the exterior of the rotors, rather than mounting the propellers onto a shaft at a top of the rotor. Likewise, a closed wing having a substantially cylindrical shape may be mounted to the fuselage and positioned to encompass the propellers. The closed wing provides protection from an impact with the edge of the propellers by an object external to the UAV and provides lift to the UAV during horizontal flight.

By positioning the fuselage within the motors and in a center of the UAV, the UAV control system, power supply, payload, etc. can be positioned within the fuselage, thereby conserving space, reducing drag, and improving aerodynamics of the UAV.

Any number of motors and corresponding propellers may be positioned to surround the fuselage. To cancel out the torque generated by one motor and corresponding first set of propellers, in some implementations, a second motor and corresponding second set of propellers may be included that rotate in a direction that is opposite a direction of rotation of the first motor and first set of propellers. Alternatively, the UAV may include a gear assembly that couples between the first set of propellers and the second set of propellers such that when the first set of propellers rotate in a first direction the second set of propellers rotate in a second direction. In such a configuration, only one motor may be needed to rotate the first set of propellers and the second set of propellers.

Finally, by positioning the motor(s) such that the stator(s) and rotor(s) are around the fuselage, the sound generated by the motors can be muffled, thereby reducing the noise generated by the UAV. For example, one or more noise dampening materials may be positioned adjacent the rotors thereby reducing the noise generated from the motors.

To improve the efficiency of the UAV, in some implementations, the closed wing, fuselage, support arms, propellers, and/or other components of the UAV may be formed of one or more lightweight materials, such as carbon fiber, graphite, machined aluminum, titanium, fiberglass, etc. Regardless of material, each of the closed wing, fuselage, support arms, etc. may be hollow, thereby reducing weight and providing a cavity through which one or more wires and/or cables may be passed and/or in which other components may be housed.

FIG. 1 illustrates a diagram of a UAV 100 having a center-mounted fuselage 102 and a closed wing 104, according to an implementation. As illustrated, the motor 110 is positioned such that it surrounds a portion of the center-mounted fuselage 102. Likewise, the propellers 112, 114 are mounted to an exterior of the motor and extend radially outward from the center-mounted fuselage 102 and the motor 110. When the motor 110 rotates, it causes the first set of propellers 114 to rotate in a first direction and the second set of propellers 112 to rotate in a second direction that is opposite the first direction, thereby canceling out the torque generated by the propeller. Motor and propeller rotation is discussed further below.

The closed wing 104 is coupled to the fuselage 102 by front support arms 106 and rear support arms 107. The closed wing is substantially cylindrical and has a height ("h") and a radius that is sufficient to encompass the propellers 112, 114 and provide lift to the UAV 100 when the UAV is aerially navigating in a direction that includes a horizontal component. By encompassing the propellers, the closed wing provides perimeter protection around the propellers.

The closed wing 104 may include any type of aerodynamic shape that results in lift when the UAV 100 is flying in a direction that includes a horizontal component. Likewise, one or more of the support arms 106, 107 may include an airfoil design that aid in the lift of the UAV when the UAV is traveling in a horizontal direction. Likewise, one or more of the support arms 106, 107 may operate as a rudder to stabilize flight of the UAV, and one or more of the support arms 106, 107 may include ailerons that can be adjusted by the UAV control system to cause the UAV 100 to pitch, yaw, and/or roll.

The UAV 100 also includes landing arms 108 upon which the UAV rests when landed on a surface. When the UAV is landed, it rests on the landing arms 108 such that the fuselage 102 is oriented so that the cylindrical shape is vertical and the top of the fuselage is pointed away from the surface. When the motor(s) of the UAV are engaged, causing the propellers to rotate, the propellers provide lift to the UAV. The support arms 106, 107, acting as rudders and/or ailerons control and stabilize the UAV 100 and it ascends vertically. As the UAV ascends, the UAV control system may cause the UAV 100 to pitch so that the flight of the UAV transitions from vertical to horizontal. As the UAV 100 pitches, the closed wing creates lift as the UAV moves horizontally, thereby improving the efficiency of the UAV 100 and extended the flight of the UAV 100.

The motor(s) 110 are mounted to and surround the fuselage 102. For example, the stator of the motor 110 may be mounted to a perimeter of the cylindrical shape of the fuselage 102. Alternatively, the stator of the motor 110 may be incorporated into the fuselage 102. For example, the fuselage has a first radius and the stator has a second radius that is substantially similar to the first radius. The stator includes a plurality of electromagnets that are controlled by the UAV control system, discussed below, to control a rotational speed of the motor and thus, the speed of the propellers connected to the motor.

The rotor, which includes a plurality of magnets, is positioned adjacent the stator and rotates around the stator when the stator is energized by the UAV control system. The propellers 112 are mounted to the exterior of the rotor and extend radially away from the center of the fuselage of the UAV 100 and the rotor.

In some implementations, the motor is effectively configured as a brushless DC outrunner motor such that the stator, which includes electromagnets, is stationary and positioned within the rotor, which rotates around the stator. In contrast to a traditional outrunner motor, rather than the propellers being mounted to a shaft that extends from a top of the rotor, the propellers are coupled to the exterior side of the rotor and extend radially outward from the rotor. Likewise, by increasing the diameter of the stator, and thus the rotor, the fuselage can be positioned within the center of the stator such that the propellers rotate around the fuselage.

As discussed further below with respect to FIGS. 4A-4B, in some implementations, a gear drive assembly may be configured so that a single motor can cause rotation of each of two sets of propellers, each set rotating in an opposite direction. The counter-rotation of the sets of propellers cancels out the torque generated by the propellers. Alternatively, or in addition thereto, in some implementations, the UAV may include redundancies, such as two or more motors so that if one of the motors becomes inoperable, flight of the UAV may be maintained. In such an implementation, each motor may include two sets of counter-rotating propellers or each motor may include a single set of propellers and the motors may cause the two sets of propellers to rotate in opposite directions.

The fuselage may be substantially hollow to reduce a weight of the UAV 100 and to provide a cavity into which the UAV control system, power supply, payload, etc. may be stored. Likewise, in addition to a substantially cylindrical shape, as illustrated in FIG. 1, the tip or front of the fuselage may be rounded to improve the aerodynamics of the UAV 100.

The propellers 112, 114 may be any form of propellers (e.g., graphite, carbon fiber) and of a size sufficient to lift the UAV 100 and any payload engaged by the UAV 100. For example, the propellers 112, 114 may each be carbon fiber propellers having a length of twenty-nine inches. While the illustration of FIG. 1 shows the propellers 112, 114 all of a same size, in some implementations, one or more of the propellers 112, 114 may be different sizes and/or dimensions. Likewise, while this example includes four lifting propellers, in other implementations, more or fewer propellers may be utilized as lifting propellers. Likewise, in some implementations, the propellers may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

In one implementation, the fuselage 102 has a diameter of approximately eighteen inches and a height of approximately thirty-six inches. Likewise, the motor(s) 110 have a similar diameter of approximately eighteen inches and the propellers 112, 114 extending radially from the motor(s) each have a length of approximately twenty-nine inches. To encompass at least a portion of the fuselage 102 and the propellers 112, 114, the closed wing 104 has an internal diameter of approximately seventy-six inches and a height (h) of approximately twenty-four inches. Likewise, the landing arms 108 may extend approximately twelve inches from a base of the closed wing 104 to support the UAV 100 when landed on a surface.

Figure 2:
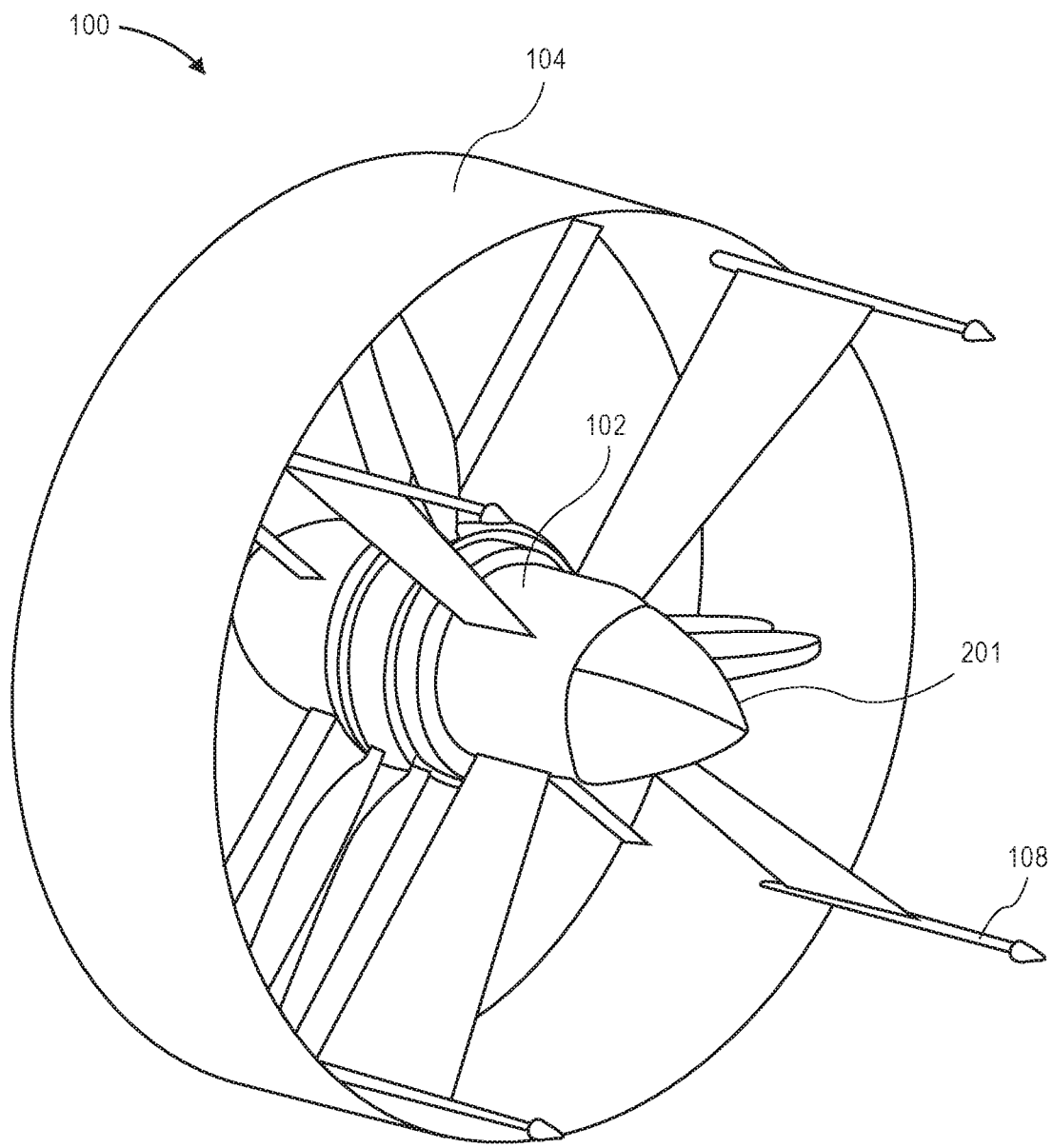
FIG. 2 depicts another view of an unmanned aerial vehicle with a center mounted fuselage and a closed wing, according to an implementation.

FIG. 2 depicts another view of the UAV 100 with a center mounted fuselage 102 and a closed wing 104, according to an implementation. Specifically, FIG. 2 illustrates a rear-view of the UAV 100. As shown, the bottom or rear of the fuselage 102 includes a fuselage access door 201 that may be positioned between an open position (not shown) which provides access to a cavity within the fuselage and a closed position, as illustrated in FIG. 2. When the fuselage access door 201 is in a closed position, as illustrated, the UAV 100 has improved aerodynamics and the contents within the cavity of the fuselage 102 are secured and protected from external elements (e.g., wind, rain). In comparison, when the fuselage access door is in the open position, the cavity of the fuselage is accessible and one or more components may be added or removed from the cavity of the fuselage 102.

In some implementations, a payload may be added into or removed from the cavity of the fuselage 102. A payload may be any item that can be aerially carried by the UAV 100. For example, the payload may be one or more items ordered from an electronic-commerce website for delivery to a specified delivery destination.

In one implementation, the UAV 100 may include a payload engagement mechanism within the fuselage 102. When the UAV 100 is to engage a payload, the UAV 100 may navigate to the payload and position itself over the payload so that the payload will fit within the cavity of the fuselage 102. In one implementation, the UAV 100 may then land on the landing arms 108 such that the payload is positioned within the cavity of the fuselage 102 and the payload engagement mechanism may engage the payload and secure the payload within the fuselage 102. In another implementation, the payload engagement mechanism may be configured to extend from within the fuselage, engage the payload, and retract the payload into a secure position within the fuselage 102. In still another example, rather than the UAV 100 navigating to and engaging a payload, the payload may be inserted into the cavity of the fuselage 102 prior to a flight of the UAV 100.

When the UAV 100 lands at a destination, such as a delivery address for the ordered item, and is supported by the landing arms 108, the fuselage access door 201 may transition from a closed position to an open position and the payload engagement mechanism may disengage the retained payload so that it is released and delivered to the destination.

Figure 3:
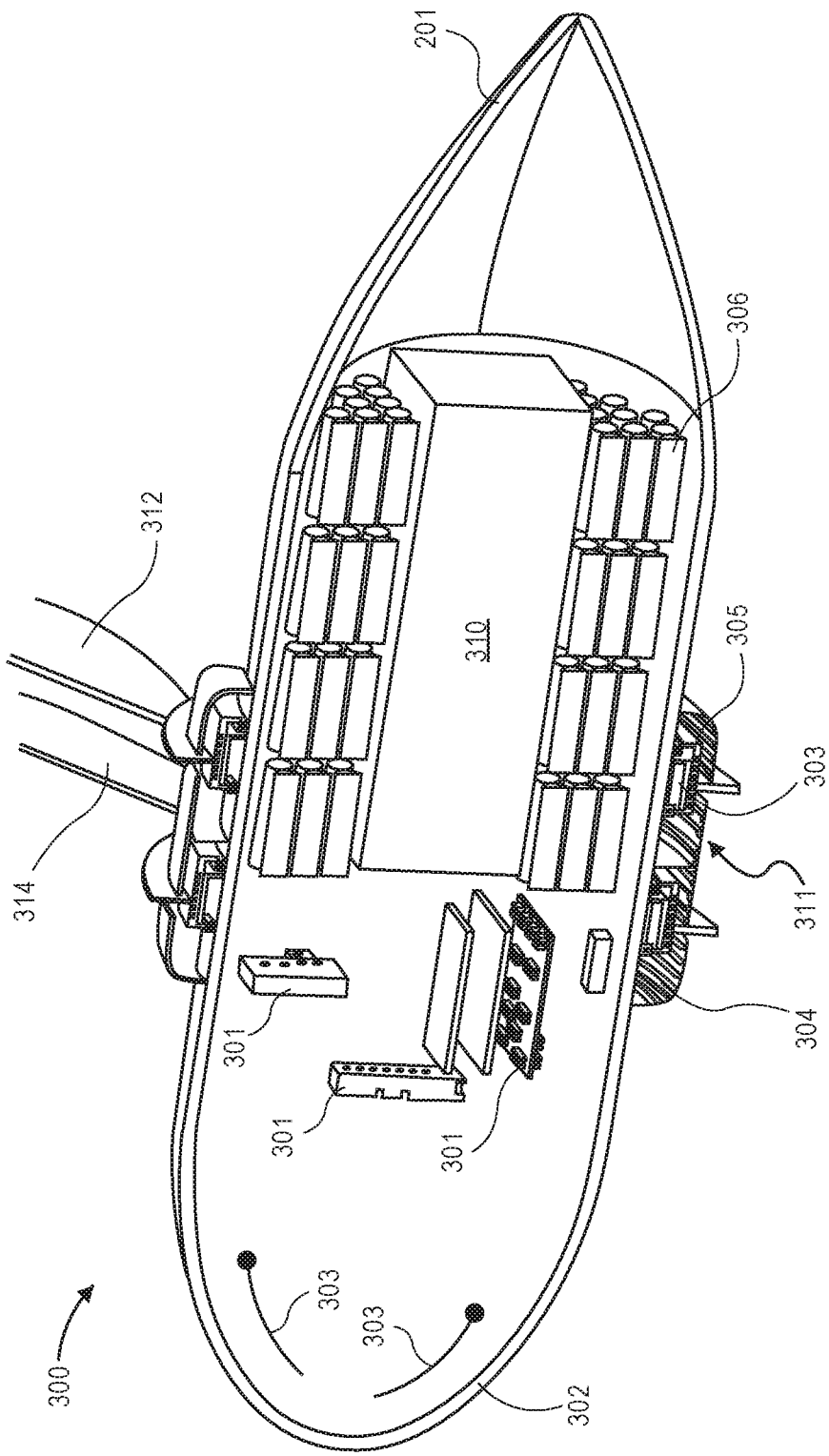
FIG. 3 depicts a cutout side-view of an unmanned aerial vehicle with a center mounted fuselage and a closed wing, according to an implementation.

FIG. 3 depicts a cutout side-view 300 of a UAV with a center mounted fuselage 302 and a closed wing (not shown), according to an implementation. As discussed above, the fuselage 302 may be substantially hollow and house components such as the UAV control system 301, power supplies 306, and a payload 310. The UAV control system 301 is discussed further below with respect to FIG. 8. The power supply 306 may be any form of power supply that provides power to the UAV control system and the motors of the UAV. For example, the power supply may be in the form of battery power, solar power, gas power, super capacitor, fuel cell, alternative power generation source, or a combination thereof. For example, the power supplies 306 may each be a 6000 mAh lithium-ion polymer battery, or polymer lithium ion (Li-poly, Li-Pol, LiPo, LIP, PLI, or Lip) battery. The power supply(s) are coupled to and provide power for the UAV control system 301, the motors 311, the payload engagement mechanism (not shown), etc.

In some implementations, one or more of the power supplies 306 may be configured such that it can be autonomously removed and/or replaced with another power supply when the fuselage access door 201 is in the open position.

As mentioned above, the UAV 100 may also include a payload engagement mechanism (not shown). The payload engagement mechanism may be configured to engage and disengage a payload 310 (e.g., an item or a container that contains items) when the fuselage access door 201 is in an open position. In other implementations, the payload engagement mechanism may operate as the container and contain items that are to be delivered to a destination. The payload engagement mechanism communicates with (via wired or wireless communication) and is controlled by the UAV control system 301.

One or more antennas 307 may be mounted within the cavity of the fuselage 302. The antennas 307 may be used to transmit and/or receive wireless communications. For example, the antennas 307 may be utilized for Wi-Fi, satellite, near field communication ("NFC"), cellular communication, or any other form of wireless communication. Other components, such as cameras, time of flight sensors, distance determining elements, gimbals, etc. may likewise be mounted within the cavity of the fuselage and/or mounted to an external surface of the fuselage 302. Alternatively, or in addition thereto, one or more other components (e.g., cameras) may be mounted to a surface of the closed wing and/or to one of the support arms.

The motor(s) 311 are configured to extend around the fuselage and the propellers 312, 314 extend radially from the sides of the rotors of the motors 311. For example, the stator 303 of the motor 311 may have a diameter that is approximately equal to a diameter of the fuselage 302, extend around the fuselage 302, and be affixed to the fuselage 302. Alternatively, the stator 303 may be incorporated into and be part of the fuselage 302. The rotor 305 is positioned adjacent to the stator 303 and rotates around the stator 303. A first set of propellers 312 are coupled to the exterior side of the rotor 305 and extend radially outward from the rotor 305.

A plurality of bearings may be affixed to the fuselage 302 adjacent the first set of propellers 312 and distributed around a portion of the fuselage. A propeller ring may likewise be positioned adjacent the first set of propellers and be rotatably coupled to the plurality of bearings so that the propeller ring rotates around the fuselage 302. A second set of propellers 314 extend radially from the exterior perimeter of the propeller ring. The second set of propellers may be a similar type and/or size as the first set of propellers. Likewise, the second set of propellers may be configured to rotate in a direction that is opposite a direction of rotation of the first set of propellers, thereby canceling the torque generated by the rotation of the first set of propellers. In some implementations, the size and/or rotational speed of the second set of propellers may be selected based on the torque generated by the rotation of the first set of propellers. Specifically, the size and/or rotational speed of the second set of propellers maybe selected such that the torque generated by the rotation of the second set of propellers is approximately equal and opposite the torque generated by the first set of propellers. Example configurations of the first set of propellers and the second set of propellers is discussed further below with respect to FIGS. 4A-4B.

A dampening material 304 may be positioned around the motor 311 to dampen noise generated by the motors, thereby reducing the overall noise generated by the propellers. The dampening material may be affixed to the fuselage 302 and extend around the stator 303 and rotor 305 of the motor 311. Likewise, the dampening material 304 may extend around the bearings and propeller ring. Any type of noise dampening material may be utilized. For example, the noise dampening material may be foam, rubber, vinyl, etc.

Figure 4A:
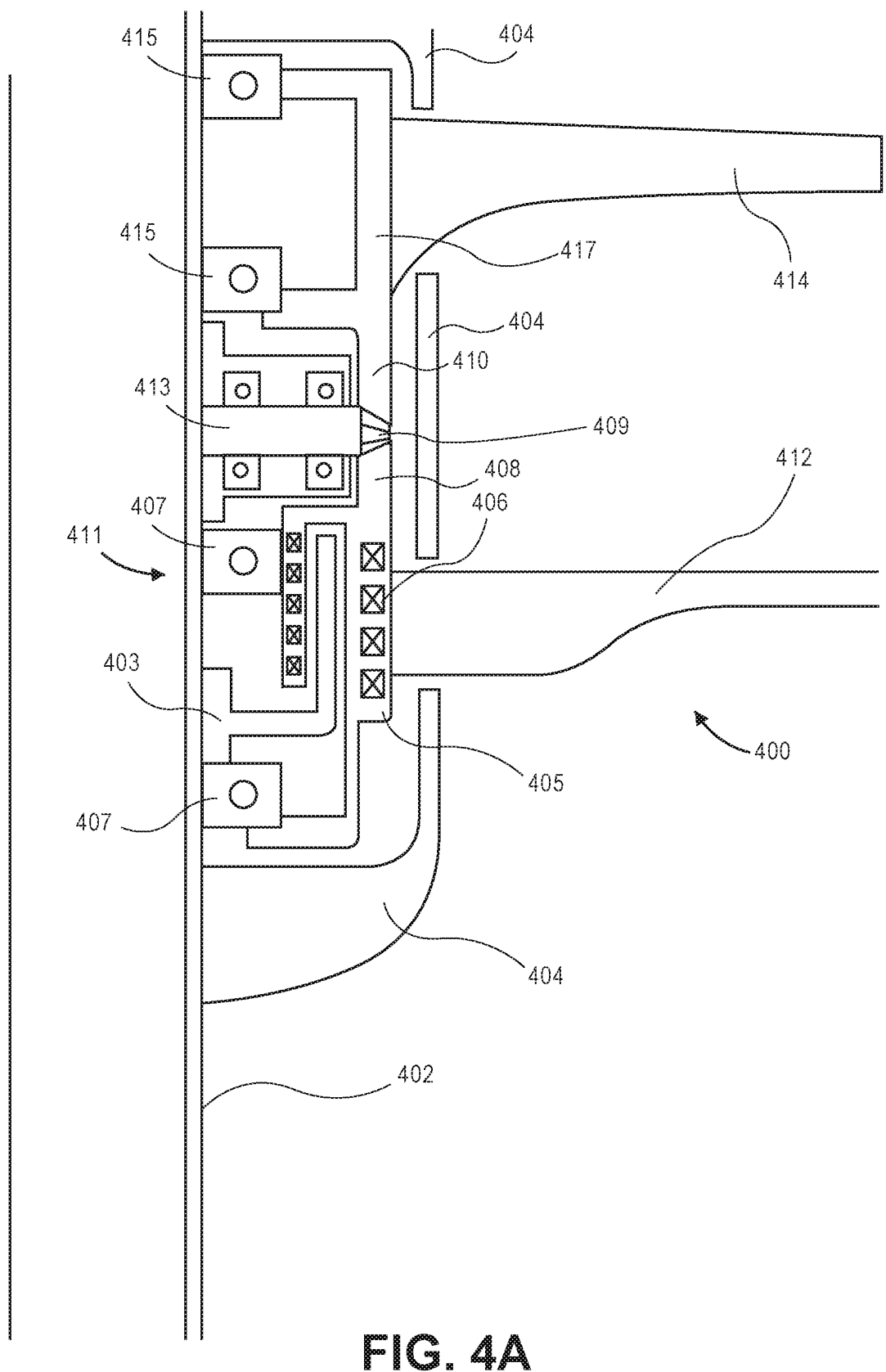
FIG. 4A depicts a diagram of cutout side-view of a motor assembly, according to an implementation.

FIG. 4A depicts a diagram of cutout side-view 400 of a motor assembly, according to an implementation. In this example, a single motor is used to rotate the first set of propellers 412 and the second set of propellers 414. As illustrated, the stator 403, which includes a series of electromagnets is coupled to the fuselage 402 and extends around the fuselage. To reduce the overall dimensions of the motor 411 the stator may have an "L" shape and corresponding rotor 405 may have a "U" shape such that it fits around the "L" shape of the stator, as illustrated. Likewise, the rotor 405 may include a plurality of magnets 406 that cause the rotor 405 to rotate around the stator 403 and thus the fuselage 402 when the UAV control system energies one or more of the electromagnets of the stator 403. The rotor 405 is positioned adjacent the stator 403. The rotor 405 may be secured to the fuselage by a series of bearings that allow the rotor 405 to rotate around the fuselage 402.

Positioned adjacent the motor 411 may be a gear assembly 413. The gear assembly 413 may be coupled to the fuselage 402 and be positioned to engage a first drive arm 408 of the rotor 405 of the motor 411. For example, the gear assembly 413 may include a gear 409 that includes a plurality of teeth that engage with teeth on the end of the first drive arm 408 of the rotor 405. As the rotor 405 rotates, the first drive arm 408 causes the gear 409 to rotate. In some implementations, multiple gear assemblies 413 may be distributed around the fuselage 402 and be positioned to engage the first drive arm 408 of the rotor 405. For example, in some implementations, four gear assemblies may be distributed around the perimeter of the fuselage.

Adjacent to the first motor 411 is a plurality of bearings 415 that are coupled to the fuselage 402 and extend around at least a portion of the perimeter of the fuselage 402. A propeller ring 407 is rotatably coupled to the plurality of bearings and positioned to rotate around the fuselage. The second set of propellers 414 extend radially from the propeller ring 417. The propeller ring 407 also includes a second drive arm 410 that is positioned to engage with the gear 409 of the gear assembly 413. By engaging the second drive arm 410 with the gear assembly 413 when the rotor 405 of the motor 411 rotates, which causes the gear 409 to rotate, it will in-turn cause the propeller ring 317 to rotate in a direction that is opposite the direction of rotation of the rotor 405.

As discussed above, a dampening material 404, such as a foam material, may be affixed to the fuselage 402 and extend around the fuselage to substantially enclose the motor 411 and the propeller ring 417.

While the example illustrated in FIG. 4A describes a single motor driving the rotation of two sets of propellers in opposite directions, which results in the torques from the sets of propellers canceling out, in other implementations, the motor 411 may cause the rotation of the first set of propellers and a second motor may cause the rotation of the second set of propellers 414. In such a configuration, the gear assembly 413 may be omitted. In still other examples, to provide redundancy and increased safety, the motor and propeller configuration illustrated in FIG. 4A may be implemented on multiple motors that extend around the perimeter of the fuselage of the UAV. In such a configuration, a first motor would cause rotation of a first set of propellers and a second set of propellers. A second motor would cause rotation of a third set of propellers and a fourth set of propellers. Such a redundant design will be discussed in further detail below with respect to FIGS. 5-7.

In some implementations, rather than configuring the motor 411 such that the stator 403 with the electromagnets and rotor 405 with the magnets 406 are near the fuselage 402, the propellers may be circumferentially driven. For example, the magnets may be positioned or included in the tips of the propellers 412 and the electromagnets may be positioned on an inner side of the closed wing 104 (FIG. 1) just opposite the propeller tips. Alternatively, rather than positioning magnets on the tips of the propellers, the propellers, or a portion thereof, may be formed of a magnetic material such that the propellers themselves function as the magnets. In still another example, a propeller rim may be included that is substantially circular in shape and coupled to the tips of each of the propeller blades. The propeller rim may be magnetic and/or may include magnets. To drive rotation of the propellers, the electromagnets positioned on the inner side of the closed wing 104 may be charged with a current which causes repelling forces with the magnets, and thus, causes rotation of the propellers.

Figure 4B:
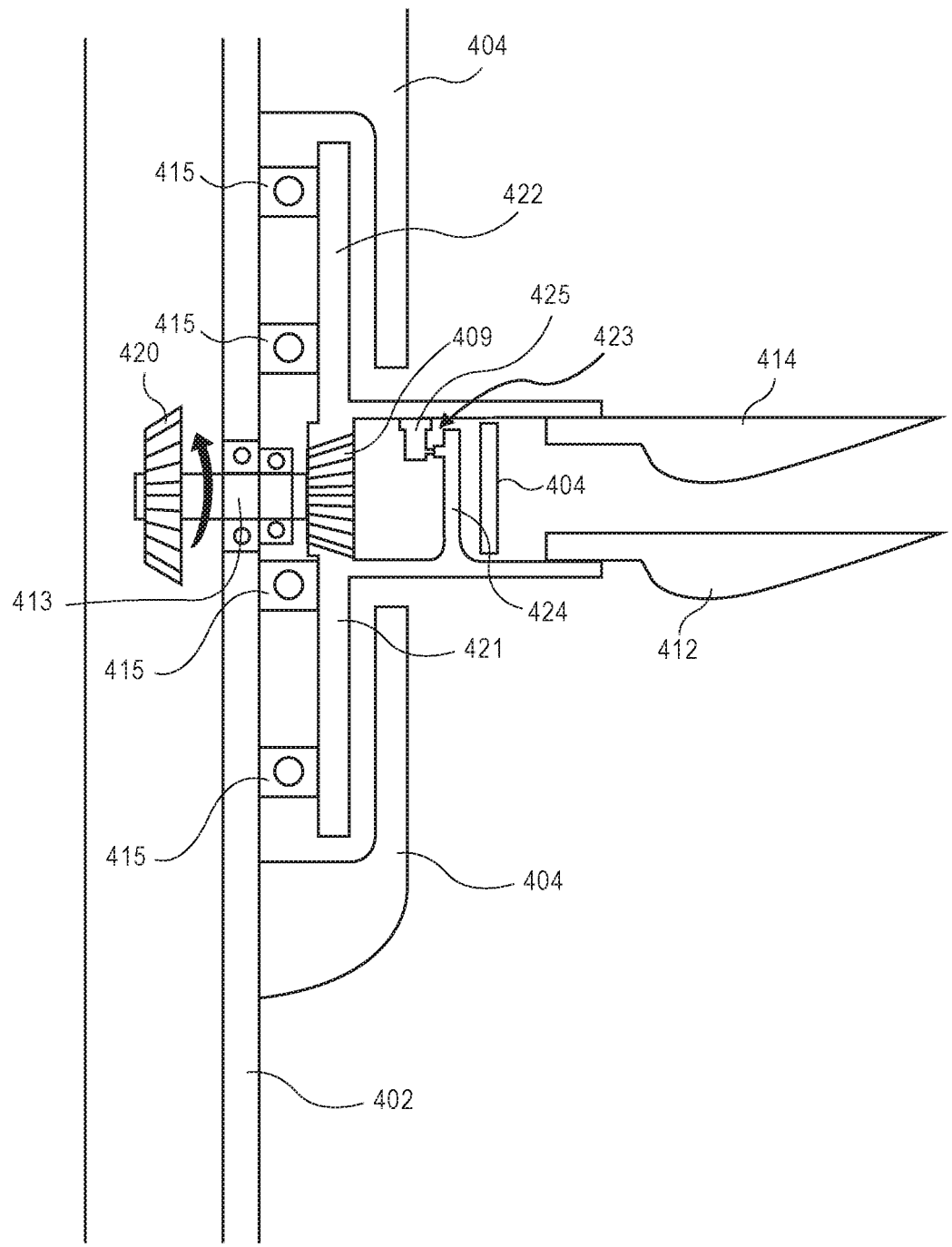
FIG. 4B depicts a diagram of another cutout side-view of a motor assembly, according to an implementation.

FIG. 4B depicts another diagram of cutout side-view 400 of a motor assembly, according to an implementation. In this example, a single motor 420 is used to rotate the first set of propellers 412 and the second set of propellers 414. In comparison to the example illustrated and discussed with respect to FIG. 4A, in this example, the single motor 420 drives the rotation of the gear assembly 413. The gear assembly 413 may be coupled to the fuselage 402 and be positioned to engage a first drive arm 421 of a first set of propellers 412 and a second drive arm 422 of a second set of propellers 414.

For example, the gear assembly 413 may include a gear 409 that includes a plurality of teeth that engage with teeth on the end of each of the first drive arm 421 and second drive arm 422. As the motor 420 rotates the gear 409, the gear 409 causes the first drive arm 421 to rotate in a first direction and the second drive arm 422 to rotate in a second direction. In some implementations, multiple gear assemblies 413 may be distributed around the fuselage 402 and be positioned to engage the first drive arm 421 and the second drive arm 422. For example, in some implementations, four gear assemblies may be distributed around the perimeter of the fuselage.

Each of the first drive arm 421 and second drive arm 422 are rotatably coupled to the fuselage so that they rotate around the fuselage when rotated by the gear 409. For example, each of the first drive arm 421 and second drive arm 422 may be rotatably coupled to the fuselage by a plurality of bearings 415 that extend around at least a portion of the perimeter of the fuselage. The first set of propellers 412 are coupled to and extend radially from the first drive arm 421. The second set of propellers are coupled to and extends radially from the second drive arm 422.

As discussed above, a dampening material 404, such as a foam material, may be affixed to the fuselage 402 and extend around the fuselage to substantially enclose the motor 420, gear assembly 413, first drive arm 421 and second drive arm 422.

In some implementations, the configuration illustrated in FIGS. 4A-4B may include a weather protective assembly 423. As illustrated, a first portion 424 of the weather protective assembly 423 may be coupled to the first drive arm 421 and a second portion 425 of the weather protective assembly 423 may be coupled to the second drive arm 422. The first portion [[423]] 424 and the second portion 425 are positioned to engage one another. In some implementations, the second portion 425 may include a rubber gasket or ring and as the propellers rotate centripetal force will cause the second portion 425 to engage the first portion [[423]] 424, establishing a weather protective barrier that protects the motor 420 and the gear assembly 413.

Figure 5:
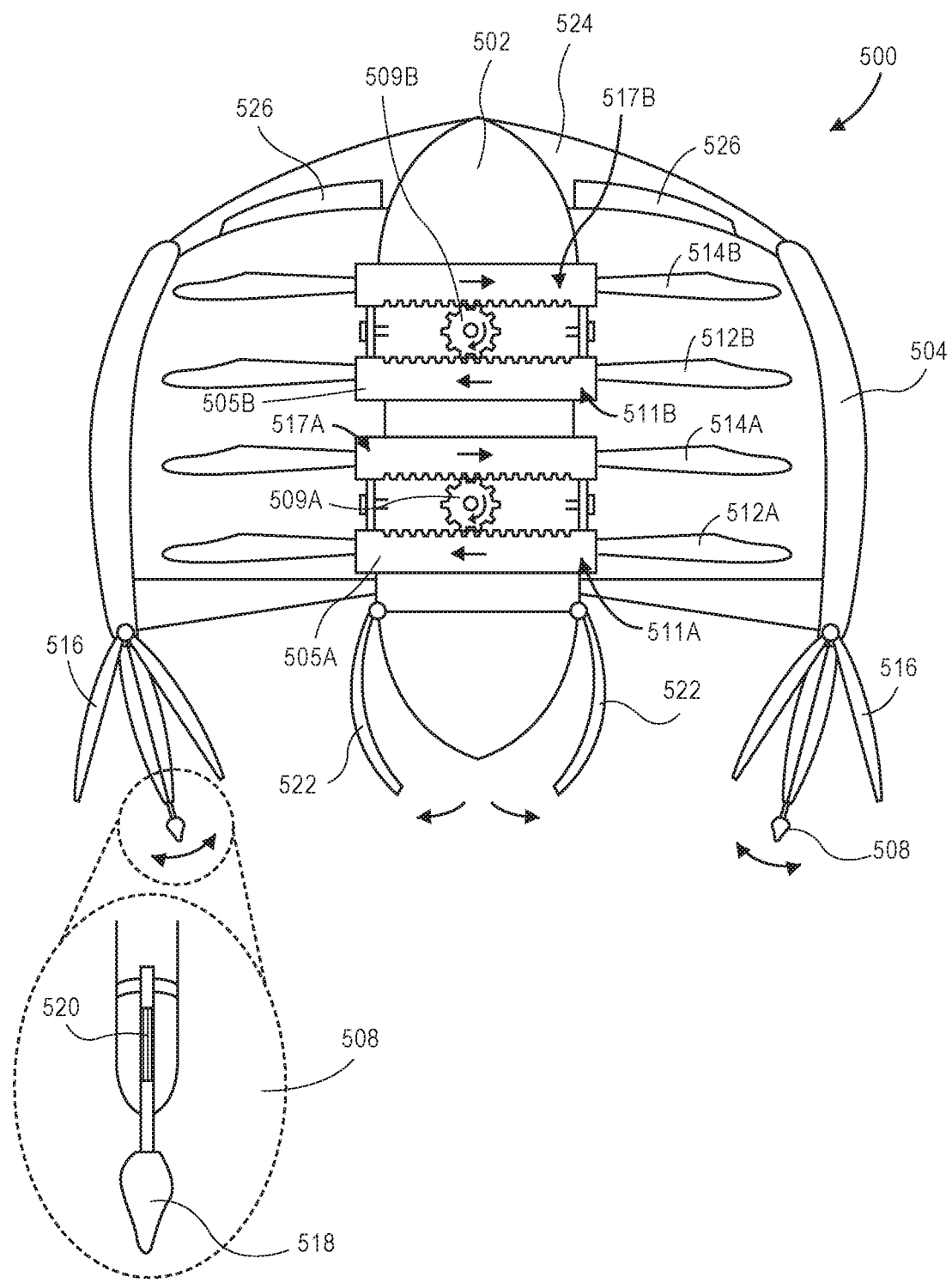
FIG. 5 depicts a side-view of an unmanned aerial vehicle with a center mounted fuselage and a closed wing, according to an implementation.

FIG. 5 depicts a side-view of a UAV 500 with a center mounted fuselage 502 and a closed wing 504, according to an implementation. In this example, the closed wing 504 has been partially omitted to facilitate view of the fuselage within the perimeter of the closed wing 504. As illustrated above, the closed wing 504 extends around the perimeter of the fuselage 502.

In the illustrated example, the UAV 500 includes two motors, each of which are causing rotation of two sets of propellers. For example, the first motor 511A causes the first set of propellers 512A, which are mounted to and extend radially from the rotor 505A, to rotate in a first direction. The gear 509A of the gear assembly engages with the drive arm of the rotor 505A, which causes the gear to rotate with the rotation of the rotor 505A. Likewise, the gear 509A engages with the second motor arm of the propeller ring 517A, which causes the second set of propellers 514A to rotate in a direction that is opposite of the rotation of the first set of propellers 512A.

In a similar manner, the second motor 511B causes the third set of propellers 512B, which are mounted to and extend radially from the rotor 505B, to rotate in a first direction. The gear 509B of the gear assembly engages with the drive arm of the rotor 505B, which causes the gear to rotate with the rotation of the rotor 505B. Likewise, the gear 509B engages with the second motor arm of the propeller ring 517B, which causes the fourth set of propellers 514B to rotate in a direction that is opposite of the rotation of the third set of propellers 512B.

In the illustrated example UAV 500, one of the front support arms that couples the closed wing 504 to the fuselage 502 is configured as a canard wing. The canard wing 524, which is a wing positioned toward a front of the UAV 500 may have an aerodynamic shape and provide additional lift and stability to the UAV 500 when the UAV is moving in a direction that includes horizontal flight. Likewise, the canard wing 524 also provides structural support by securing a portion of the front of the closed wing 504 to the fuselage. The canard wing 524 may also include ailerons 526 that may be controlled by the UAV control system to induce pitch, yaw, and/or roll of the UAV during flight.

Also illustrated in FIG. 5 are the landing arms 508 that extend down from the closed wing 504 and provide supports on which the UAV 500 may rest when landed. As illustrated in the expanded view, in some implementations, the landing arms 508 may include a surface engagement component 518 and a compression component 520 that compresses as the weight of the UAV 500 comes to rest on the surface engagement component 518 when landing. The compression component 520 provides shock absorption to the UAV to reduce the impact forces caused when the UAV 500 lands on a surface. The compression component 520 may be any form of compression such as a spring, piston, etc.

The UAV 500 also includes a plurality of ailerons 516 that extend from the rear or bottom of the closed wing 504. As illustrated, the ailerons 516 may be pivoted with respect to the closed wing 504 and be controlled by the UAV control system to induce yaw, pitch, and/or roll of the UAV and to aid in stabilizing flight of the UAV 500. Any number and arrangement of ailerons 516 may be distributed around the base or bottom of the closed wing 504 of the UAV.

Finally, illustrated in FIG. 5 is the fuselage access door 522, illustrating that the fuselage access door 522 can be positioned between an open position and a closed position, as discussed above.

Figure 6:
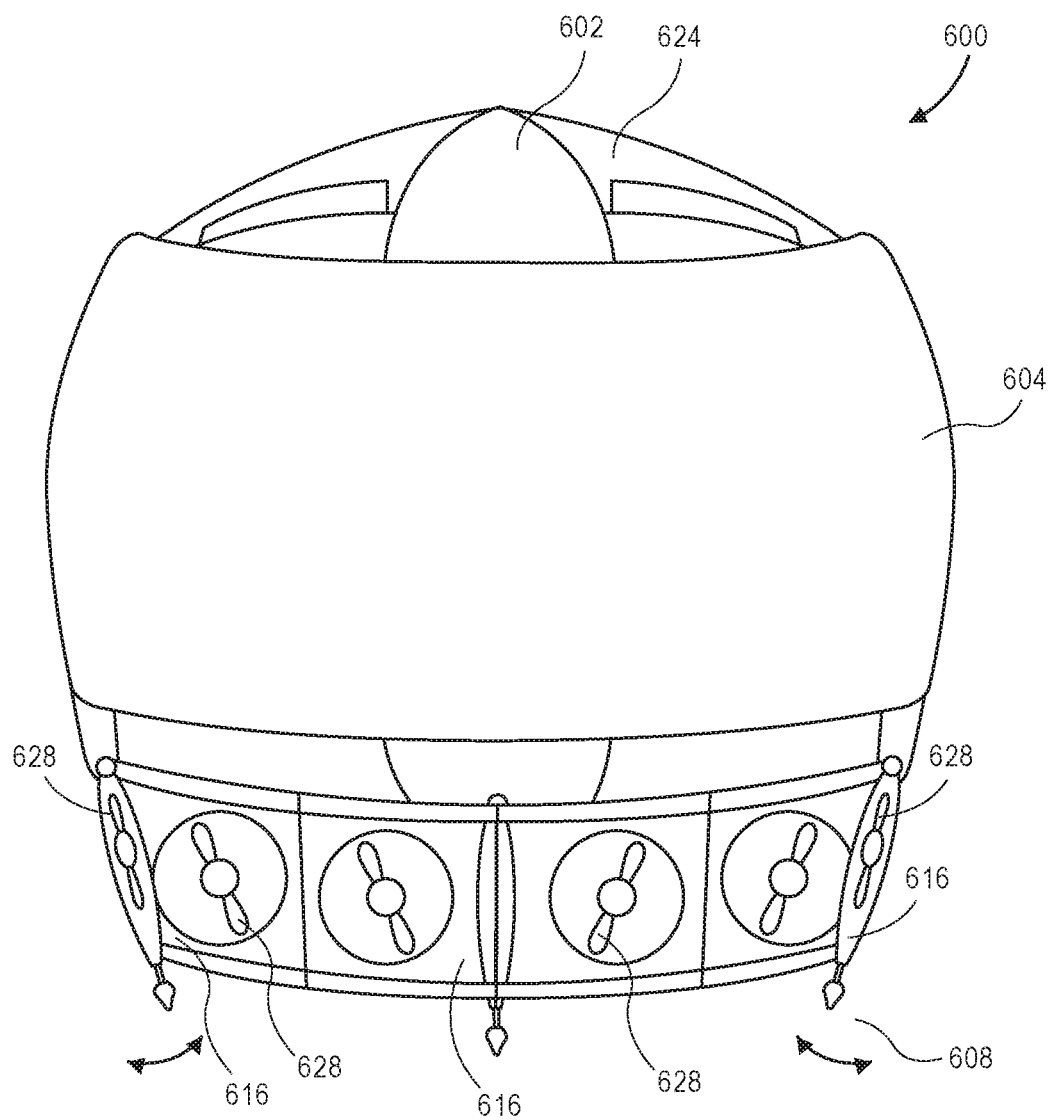
FIG. 6 depicts a side-view of another unmanned aerial vehicle with a center mounted fuselage and a closed wing, according to an implementation.

FIG. 6 depicts a side-view of another UAV 600 with a center mounted fuselage 602 and a closed wing 604, according to an implementation. In this illustration, the closed wing is shown encompassing the fuselage 602 and the propellers. However, in this example, each of the ailerons are configured as guidance propulsion mechanisms 616 that include a guidance motor and corresponding guidance propeller 628. While this example shows each of the guidance propulsion mechanisms 616 including a guidance motor and guidance propeller 628, in other implementations less than all of the guidance propulsion mechanisms may include a guidance motor and guidance propeller. Likewise, rather than the guidance propulsion mechanisms being distributed completely around the base or rear of the closed wing 604, in other implementations, the guidance propulsion mechanisms may be distributed at different points around the base or rear of the closed wing 604.

The guidance propulsion mechanisms 616 are controlled by the UAV control system and may be used to aid in the lift, guidance and/or agility of the UAV 600, in addition to providing the ability to induce yaw, pitch, and/or roll of the UAV 600. For example, when the guidance propulsion mechanisms 616 are in the position illustrated in FIG. 6, the motors may be deactivated and the UAV aerially navigated using the motors and propellers encompassed within the closed wing. Likewise, if the UAV is moving in a direction that includes a horizontal component, the closed wing 504 and/or the canard wing 624 may provide lift to the UAV 600. Likewise, the guidance propulsion mechanisms 616 may be adjusted or pivoted with respect to the closed wing to induce pitch, yaw, and/or roll of the UAV 600, thereby acting as ailerons.

Figure 7:
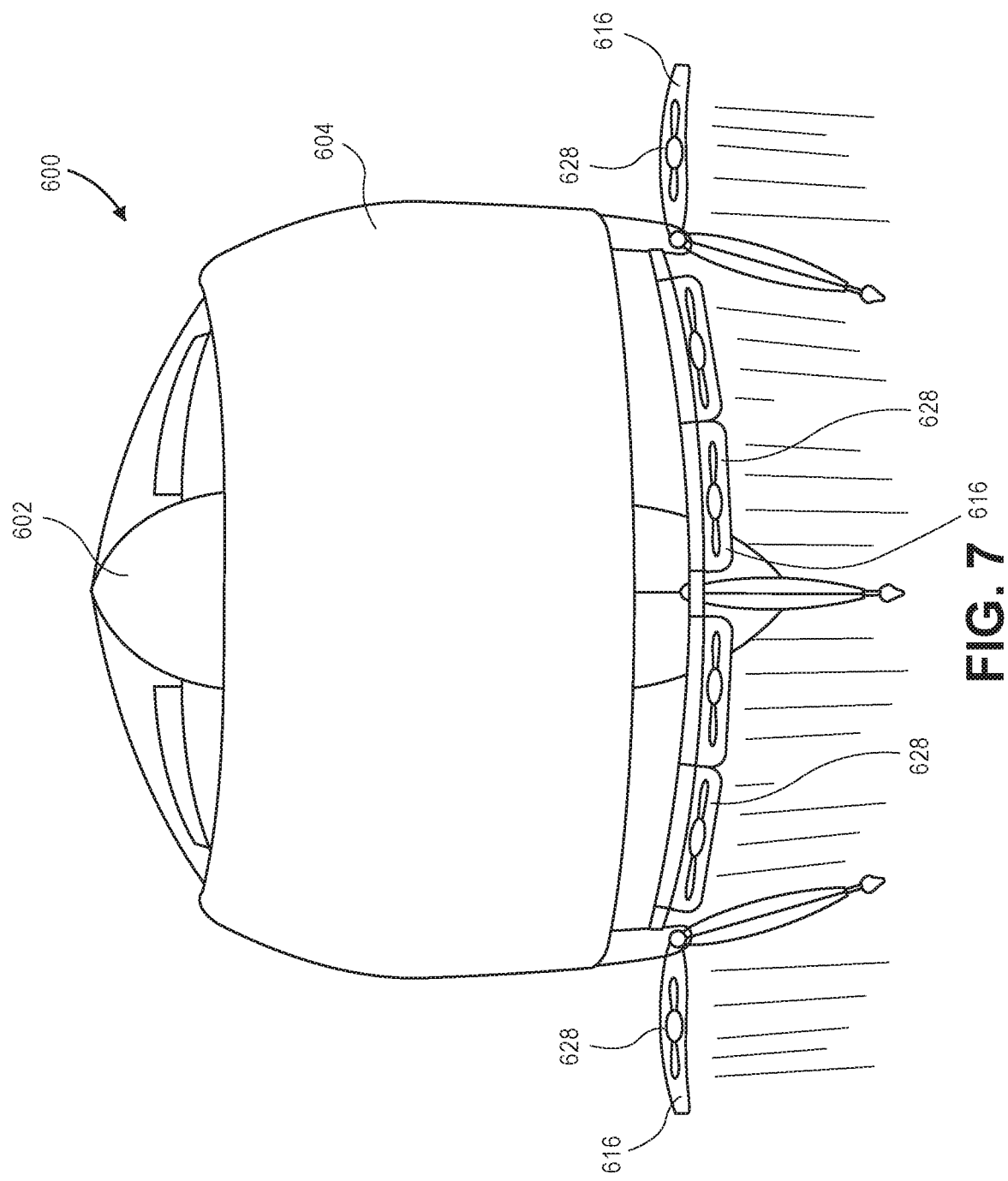
FIG. 7 depicts a side-view of another unmanned aerial vehicle with a center mounted fuselage and a closed wing, according to an implementation.

When the guidance propulsion mechanisms 616 are rotated outward, as illustrated in FIG. 7, the motors may be engaged thereby causing the propellers 628 to rotate and generate thrust. As illustrated in FIG. 7, one or more of the guidance propulsion mechanisms 616 may be rotated outward with respect to the closed wing 604 and the motors engaged. When in the position illustrated in FIG. 7, the guidance propulsion mechanisms 616 provide lift to the UAV 600 and may be used to aid in the takeoff and/or landing of the UAV 600, as well as providing control and thrust as the UAV transitions from flight in a vertical direction to flight in a horizontal direction. For example, as the UAV is flying vertically, the guidance propulsion mechanisms 616 may operate to provide lift to the UAV. As the UAV begins to rotate and move in a horizontal direction, lift from the closed wing is provided. The guidance propulsion mechanisms 616 may then rotate back into alignment with the closed wing 604 and the guidance motors may disengage so that the UAV can be aerially navigated by the motors and propellers that are encompassed within the closed wing, as discussed above.

The guidance motors and corresponding guidance propellers 628 of the guidance propulsion mechanisms 616 may be smaller in diameter than the motors that surround the fuselage 602 and, as such, may be more responsive and provide increased agility and control of the UAV 600. While this example describes the use of guidance motors and corresponding guidance propellers to aid in the lift and/or agility of the UAV, it will be appreciated that other forms of propulsion may be used with the implementations described herein to provide lift and/or guidance control. For example, fans, jets, turbojets, turbo fans, jet engines, internal combustion engines, and the like may be included in one or more of the guidance propulsion mechanisms 616 and used (either with propellers or other devices) to provide lift and/or guidance control for the UAV.

Figure 8:
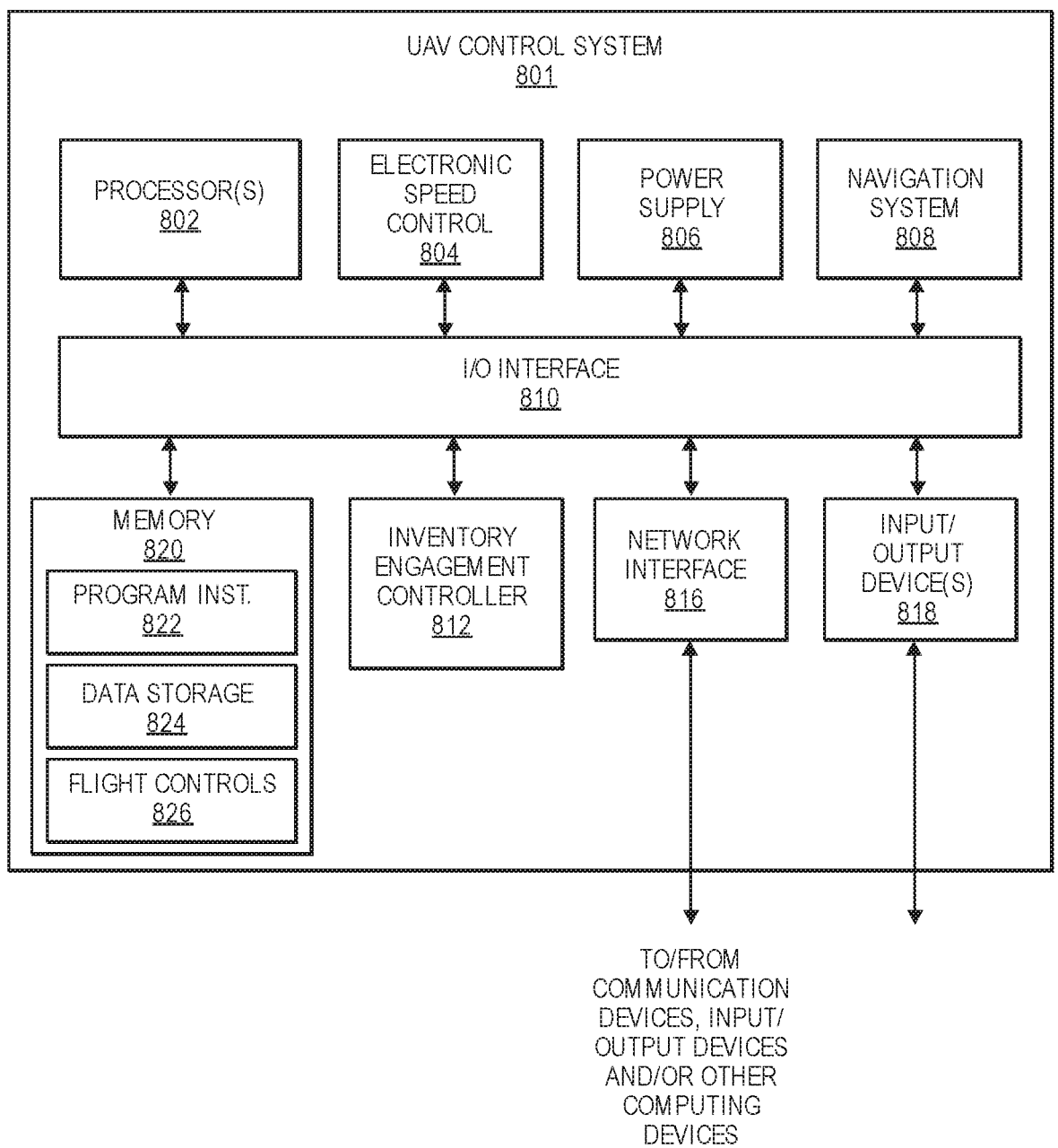
FIG. 8 is a block diagram of an illustrative implementation of an unmanned aerial vehicle control system, according to an implementation.

FIG. 8 is a block diagram illustrating an example UAV control system 801 of a UAV. In various examples, the block diagram may be illustrative of one or more aspects of the UAV control system 801 that may be used to implement the various systems and methods discussed herein and/or to control operation of a UAV. In the illustrated implementation, the UAV control system 801 includes one or more processors 802, coupled to a memory, e.g., a non-transitory computer readable storage medium 820, via an input/output (I/O) interface 810. The UAV control system 801 may also include electronic speed controls 804 (ESCs), power supplies 806 and/or a navigation system 808. The UAV control system 801 further includes a payload engagement controller 812, a network interface 816, and one or more input/output devices 818.

In various implementations, the UAV control system 801 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths, flight control parameters, and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 820 as program instructions 822, data storage 824, and flight controls 826, respectively. In other implementations, program instructions, data, and/or flight controls may be received, sent, or stored upon different types of computer-accessible media, such as non-transitory media, or on similar media separate from the non-transitory computer readable storage medium 820 or the UAV control system 801. Generally speaking, a non-transitory, computer readable storage medium may include storage media or memory media such as magnetic or optical media, e.g., disk or CD/DVD-ROM, coupled to the UAV control system 801 via the I/O interface 810. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The ESCs 804 communicate with the navigation system 808 and adjust the rotational speed of each motor to stabilize the UAV, guide the UAV along a determined flight path, and/or cause rotation of the UAV.

The navigation system 808 may include a global positioning system (GPS), indoor positioning system (IPS), or other similar system and/or sensors that can be used to navigate the UAV to and/or from a location. The payload engagement controller 812 communicates with the payload engagement mechanism used to engage and/or disengage items.

The network interface 816 may be configured to allow data to be exchanged between the UAV control system 801, other devices attached to a network, such as other computer systems (e.g., remote computing resources), and/or with UAV control systems of other UAVs. For example, the network interface 816 may enable wireless communication between the UAV and a UAV control system that is implemented on one or more remote computing resources. For wireless communication, an antenna of an UAV or other communication components may be utilized. As another example, the network interface 816 may enable wireless communication between numerous UAVs. In various implementations, the network interface 816 may support communication via wireless general data networks, such as a Wi-Fi network. For example, the network interface 816 may support communication via telecommunications networks, such as cellular communication networks, satellite networks, and the like.

Input/output devices 818 may, in some implementations, include one or more displays, imaging devices, thermal sensors, infrared sensors, time of flight sensors, accelerometers, pressure sensors, weather sensors, etc. Multiple input/output devices 818 may be present and controlled by the UAV control system 801. One or more of these sensors may be utilized to assist in landing as well as to avoid obstacles during flight.

As shown in FIG. 8, the memory may include program instructions 822, which may be configured to implement the example routines and/or sub-routines described herein. The data storage 824 may include various data stores for maintaining data items that may be provided for determining flight paths, landing, identifying locations for disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 801 is merely illustrative and is not intended to limit the scope of the present disclosure. In particular, the computing system and devices may include any combination of hardware or software that can perform the indicated functions. The UAV control system 801 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 801. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the UAV control system 801 may be transmitted to the UAV control system 801 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An aerial vehicle, comprising:
   a fuselage having an associated outer periphery;
   a motor including a stator and a rotor, the stator coupled to the outer periphery of the fuselage;
   a first one or more propellers coupled to the rotor and extending in a first radial pattern from the fuselage, the first one or more propellers rotated by the rotor of the motor in a first direction around the fuselage;
   a second one or more propellers extending in a second radial pattern from the fuselage, the second one or more propellers rotating in a second direction around the fuselage, wherein the second direction is opposite the first direction; and
   a closed wing coupled to the fuselage and surrounding the first one or more propellers and the second one or more propellers;
   wherein the closed wing is coupled to the fuselage by at least one canard wing.

2. The aerial vehicle of claim 1, wherein:
   the fuselage has a first height and the outer periphery of the fuselage has a first radius; and
   the closed wing has a second radius that is greater than the first radius and a second height that is less than the first height.

3. The aerial vehicle of claim 1, further comprising:
   a power supply disposed within the fuselage and configured to at least power the motor.

4. The aerial vehicle of claim 1, further comprising:
   a control system configured to at least cause the motor to rotate the first one or more propellers to generate a first torque; and
   wherein rotation of the second one or more propellers in the second direction generates a second torque that substantially cancels the first torque.

5. An aerial vehicle, comprising:
   a fuselage;
   a control system to control flight of the aerial vehicle, wherein the control system is encompassed within the fuselage;
   a motor in communication with the control system, the motor including:
      a stator coupled to an outer profile of the fuselage; and
      a rotor;
   a first plurality of propellers coupled to the rotor and configured to rotate in a first direction with a rotation of the rotor;
   a second plurality of propellers configured to rotate in a second direction that is opposite the first direction; and
   a closed wing coupled to the fuselage by at least one canard wing, the closed wing having a substantially cylindrical shape and surrounding the first plurality of propellers and the second plurality of propellers.

6. The aerial vehicle of claim 5, further comprising:
   a second motor in communication with the control system and configured to receive instructions from the control system, the second motor including:
      a second stator coupled to the outer profile of the fuselage; and
      a second rotor; and
   wherein the second plurality of propellers are coupled to the second rotor.

7. The aerial vehicle of claim 6, wherein the first plurality of propellers and the second plurality of propellers have at least one of: different amounts of propellers or different sized propellers.

8. The aerial vehicle of claim 5, further comprising:
   a noise dampener substantially surrounding the motor.

9. The aerial vehicle of claim 5, wherein the rotor rotates around the fuselage.

10. The aerial vehicle of claim 5, further comprising:
    a plurality of landing supports extending from the closed wing and configured to support the aerial vehicle when landed on a surface.

11. The aerial vehicle of claim 10, wherein at least one of the plurality of landing supports includes a compression component configured to compress when the aerial vehicle lands.

12. The aerial vehicle of claim 5, further comprising:
    a payload engagement mechanism positioned within the fuselage and configured to retain a payload within the fuselage.

13. The aerial vehicle of claim 5, wherein the fuselage includes a cavity and a fuselage access door, the fuselage access door is configured to have a closed position and an open position.

14. The aerial vehicle of claim 13, wherein the cavity of the fuselage is configured to receive at least one of a payload or a power supply when the fuselage access door is in the open position.

15. The aerial vehicle of claim 5, wherein:
a propeller of the first plurality of propellers extends from the fuselage a distance;
the closed wing has a radius that is greater than the distance; and
the closed wing encompasses the first plurality of propellers.

16. A computer-implemented method of controlling a flight of an aerial vehicle, the method comprising:
causing a first motor to rotate a first one or more propellers in a first direction around a fuselage of the aerial vehicle, wherein the fuselage is within a closed wing, wherein the fuselage is coupled to the closed wing by at least one canard wing, and wherein the first motor includes a stator and a rotor, the stator coupled to an outer periphery of the fuselage, and the first one or more propellers coupled to the rotor of the first motor; and
causing rotation of a second one or more propellers in a second direction around the fuselage, wherein the second direction is opposite the first direction, and wherein the first one or more propellers and the second one or more propellers are disposed within the closed wing.

17. The computer-implemented method of claim 16, further comprising:
inducing at least one of a yaw, a pitch, or a roll based at least in part by controlling a plurality of ailerons that extend from the closed wing.

18. The computer-implemented method of claim 16, further comprising:
setting a rotation speed of the first motor such that a torque generated by rotation of the first one or more propellers substantially cancels a torque generated by rotation of the second one or more propellers.

19. The computer-implemented method of claim 18, further comprising:
positioning a plurality of guidance propulsion mechanisms in a first position; and
engaging the plurality of guidance propulsion mechanisms while in the first position to provide guidance to the aerial vehicle during a vertical flight of the aerial vehicle.

* * * * *